United States Patent [19]
Chiang

[11] Patent Number: 6,039,499
[45] Date of Patent: Mar. 21, 2000

[54] SUPPORTING BRACKET FOR BRAKING CABLE OF BICYCLE

[76] Inventor: Douglas Chiang, 487, Ko-Chung Rd., Ta-Li City, Taichung Hsien, Taiwan

[21] Appl. No.: 09/071,595

[22] Filed: May 4, 1998

[51] Int. Cl.⁷ .................................................. B62K 21/12
[52] U.S. Cl. .......................... 403/78; 403/164; 403/371; 280/264; 74/489; 74/502.6; 74/502.4
[58] Field of Search ............................. 403/78, 24, 164, 403/369, 371, 302; 74/489, 502.2, 502.6, 502.4; 248/51, 52, 65; 280/279, 264

[56] References Cited

U.S. PATENT DOCUMENTS

| | | |
|---|---|---|
| 4,616,523 | 10/1986 | Jones .......................................... 74/501 |
| 4,753,448 | 6/1988 | Nagashima ............................... 280/264 |
| 5,387,255 | 2/1995 | Chiang ..................................... 74/551.1 |
| 5,553,511 | 9/1996 | Marui ....................................... 74/551.1 |
| 5,775,709 | 7/1998 | Chen ......................................... 280/279 |
| 5,791,671 | 8/1998 | Tang et al. ............................... 280/264 |

Primary Examiner—Lynne H. Browne
Assistant Examiner—John R. Cottingham
Attorney, Agent, or Firm—Bacon & Thomas PLLC

[57] ABSTRACT

A supporting bracket is provided so that the braking pad may be readily controlled by a single braking cable and the steering angle of the handlebar will not be limited. The supporting bracket of the invention is specially suitable for terrain and acrobatic exercise applications. The present invention overcomes the difficulty or shortcoming of the conventional supporting bracket. The inventive bracket features a simplified configuration that may be readily constructed and assembled. Furthermore, the cost may be lowered, thus having economic value.

1 Claim, 5 Drawing Sheets

SUPPORTING BRACKET FOR BRAKING CABLE OF BICYCLE

FIELD OF THE INVENTION

The present invention relates to a supporting bracket, more particularly, to a supporting bracket for a braking cable of a bicycle.

DESCRIPTION OF THE PRIOR ART

As shown in FIG. 1, the rotary mechanism of the vertical tube of the handlebar generally comprises an upper ring 11 and a lower ring 12. Each of the upper and lower rings 11, 12 is provided with a retaining groove 111, 121 at the perimeter and those retaining grooves are aligned with each other. A plurality of steel balls 13 is moveably disposed between the upper and lower rings 11, 12. The sub-assembly of the upper and lower rings 11, 12 is enveloped onto the vertical tube of the handlebar. The open end of the braking cable of the bicycle is disposed within the retaining grooves 111, 121 of the upper and lower rings 11, 12 respectively By this arrangement, when the handlebar is steered to rotate, the upper and lower rings 11, 12 are rotated synchronically.

However, there are a variety of bicycles and some of them are specially designed for terrain or acrobatic exercise applications. In order to meet the special requirement of those bicycles, the manipulating capability of the handlebar must also be increased, for example, the steering angle of the handlebar. In some cases, the handlebar shall be rotated through 360 degrees. In this case, the conventional sub-assembly of the upper and lower rings will bring a limitation to the steering angle of the handlebar as the braking cable will be wound around the vertical tube and the manipulating capability of the bicycle is impaired.

Furthermore, the conventional sub-assembly of the upper and lower rings is quite complicated in its configuration and is not designed as a part of the bicycle. This entails a difficult assembling process. This is also a reason why the maker does not accept these conventional upper and lower rings.

SUMMARY OF THE INVENTION

It is the objective of the present invention to provide a supporting bracket for a braking cable of a bicycle in which the braking pad may be readily controlled by a single braking cable. Additionally, the steering angle of the handlebar will not be limited. This supporting bracket is specially suitable for a bicycle for terrain and acrobatic exercise application.

It is further an objective of this invention to provide an improved supporting bracket for a braking cable of a bicycle wherein the above objectives may be readily achieved.

BRIEF DESCRIPTION OF DRAWINGS

In order that the present invention may more readily be understood, the following description is given, merely by way of example, with reference to the accompanying drawings, in which.

DETAILED DESCRIPTION OF PREFERRED EMBODIMENT

Figure 1:
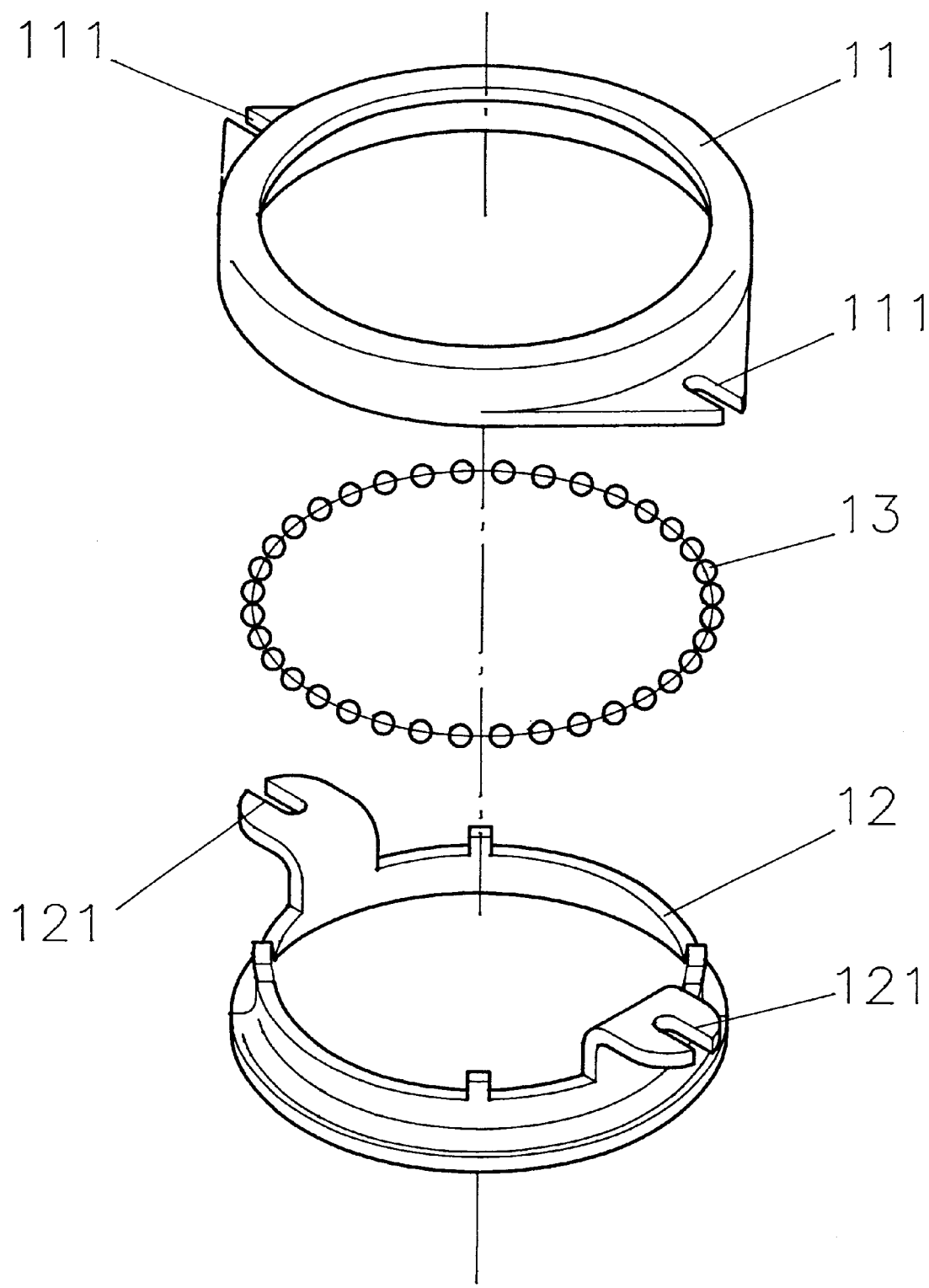
FIG. 1 is a schematic illustration of a conventional supporting bracket for a braking cable of a bicycle.
Figure 2:
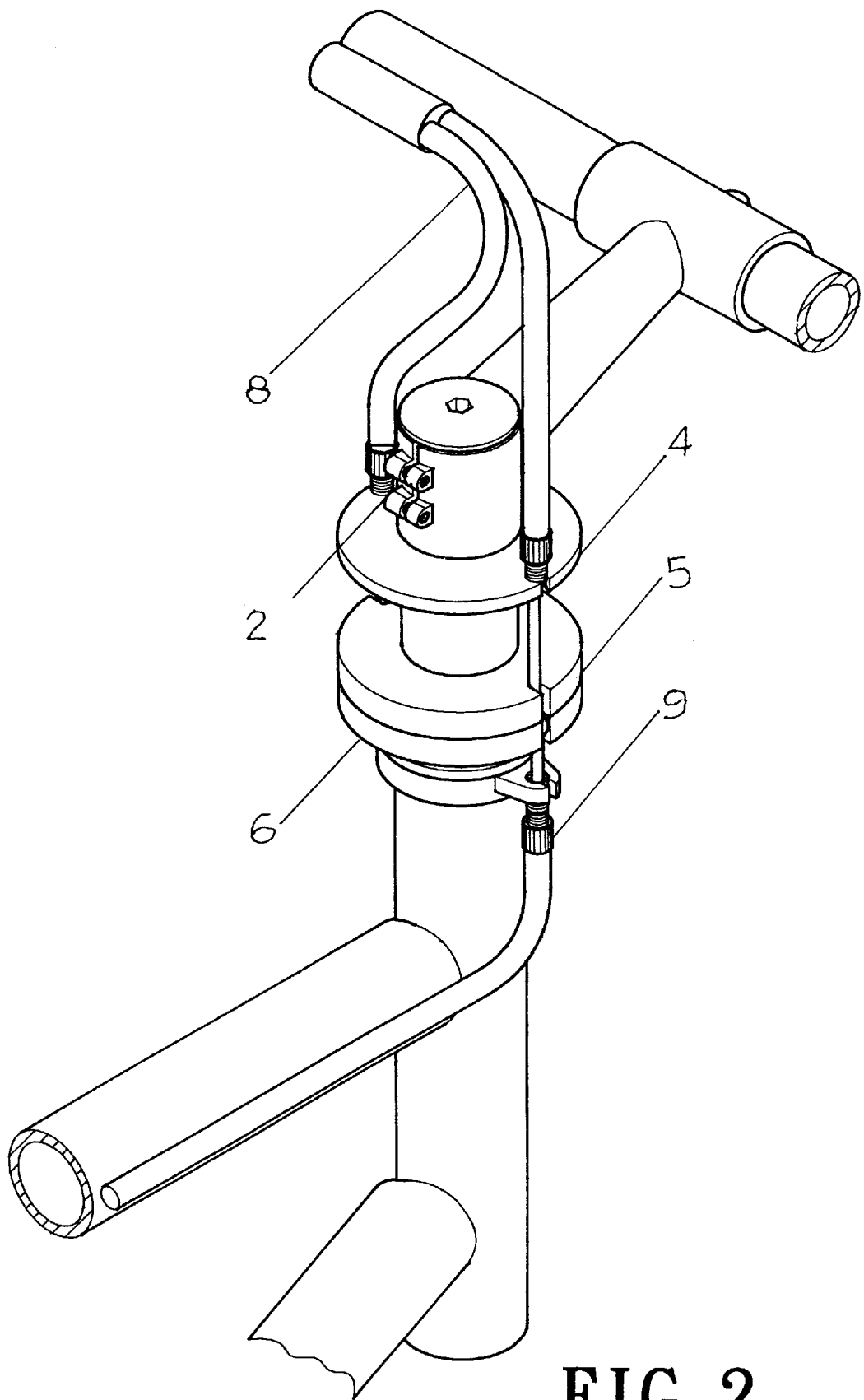
FIG. 2 is a schematic illustration of the supporting bracket for a braking cable of a bicycle made according to the present invention.
Figure 3:
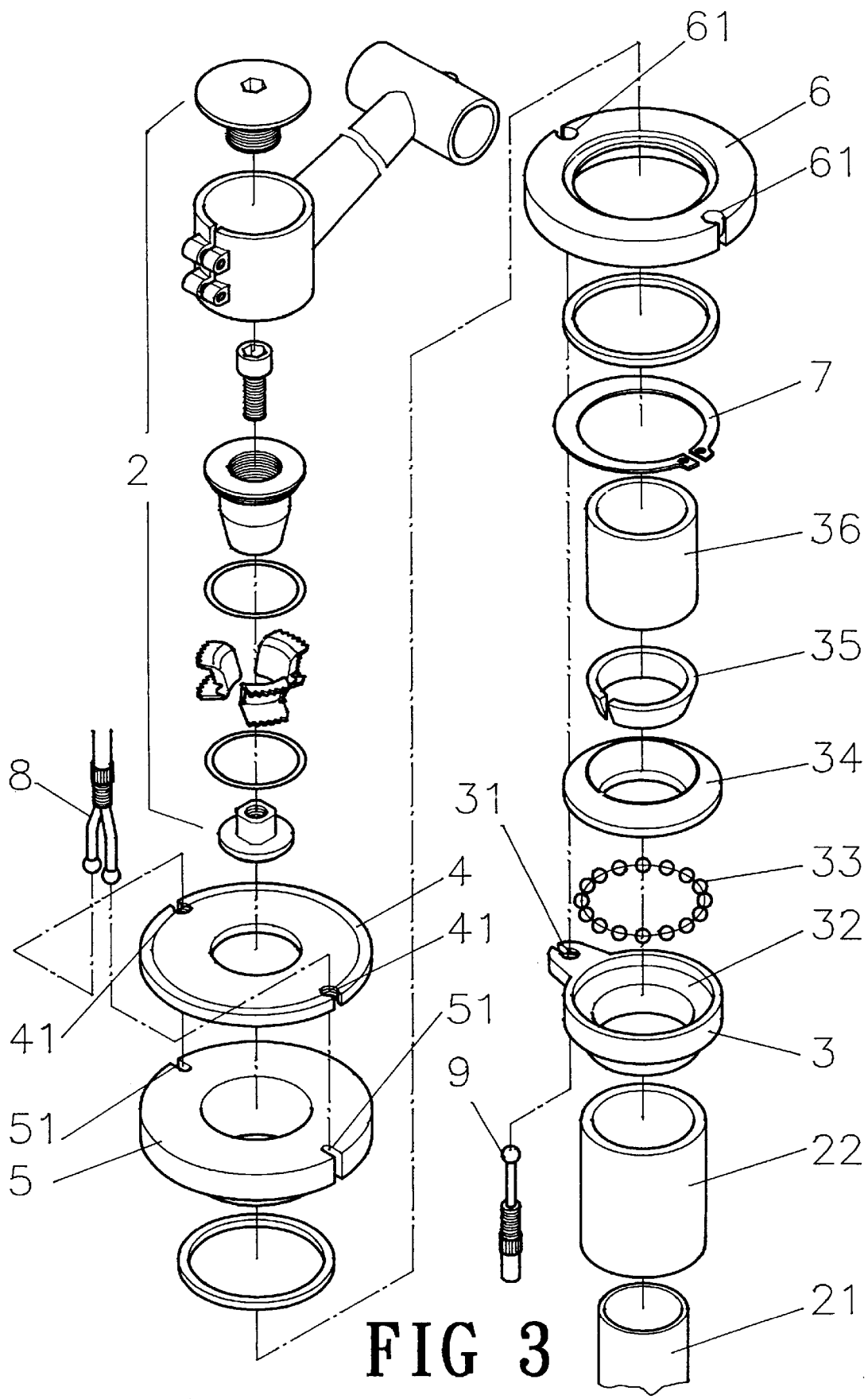
FIG. 3 is an exploded view of the supporting bracket shown in FIG. 2.

Referring to FIGS. 2 and 3, the schematic illustration and the exploded view of the supporting bracket are respectively shown. The left upper part is a bowl-type assembly 2 of the handlebar and the left lower parts are a vertical tube 21 of the front fork member and an external tube 22. The external tube 22 is enveloped onto the vertical tube 21 of the front fork member. The vertical tube 21 of the front fork member is mounted with a lower braking cable socket 3 that has a truncated shape and is biased against a top end of the external tube 22. One side of the socket 3 is extended with a retaining emboss 31. The top of the socket 3 is provided with a receiving slot 32. A plurality of steel balls 33 is moveably disposed within the slot 32. A covering lid 34 is further enclosed onto the socket 3. A first C-type retainer 35 is disposed between the lid 34 of the socket 3 and the vertical tube 21 of the front fork in a manner such that it is secured onto the vertical tube 21 of the front fork member. A sliding collar 36 is moveably arranged onto the vertical tube 21 above the covering lid 34. A primary rotational disk 4 is disposed onto the bowl-type assembly 2 which is disposed at a top end of the vertical tube 21 of the front fork member. A pair of retaining slots 41 is arranged opposite to each other on peripheral sides of the primary rotational disk 4. An upper rotational disk 5 and a lower rotational disk 6 are further arranged onto the sliding collar 36 below the primary rotational disk 4 as shown. A second C-type retainer 7 is disposed at a lower extension of the upper rotational disk 5 in a manner such that the upper and lower disks 5, 6 are joined to move axially together. Each of the upper and lower disks 5, 6 is provided with a pair of retaining slots 51 and at least one retaining slot 61, respectively.

Figure 4:
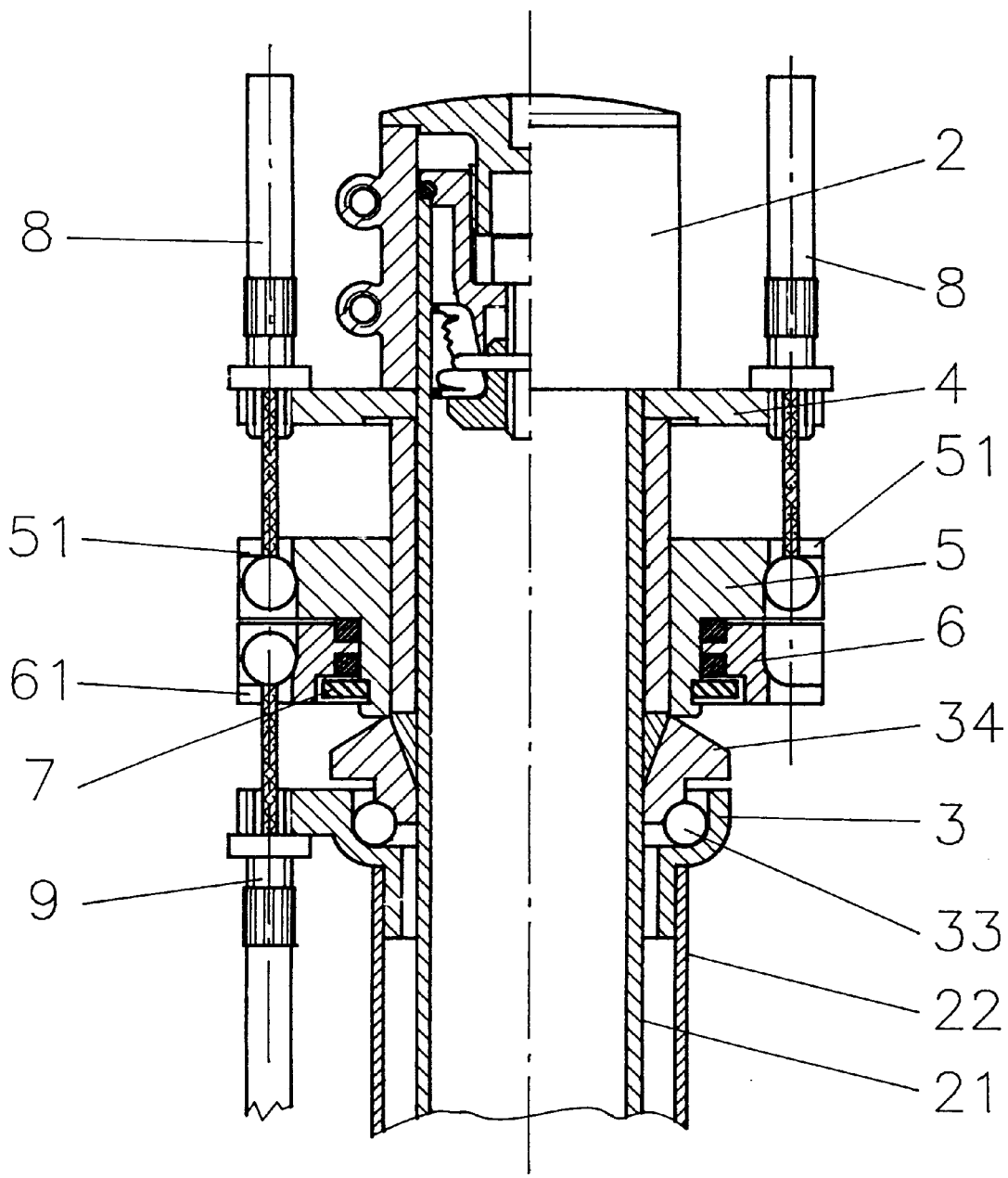
FIG. 4 is a cross sectional view of the supporting bracket.

FIG. 4 is a cross sectional view of the supporting bracket. It may be readily seen that an upper braking cable 8 is branched into two parts and each of the two parts is disposed within the retaining slots 41 and 51 of the rotational disk 4 and the upper disk 5. An end of a lower primary braking cable 9 is then disposed within the at least one retaining slot 61 of the lower rotational disk 6 and the retaining emboss 31 of the lower braking cable socket 3.

Figure 5:
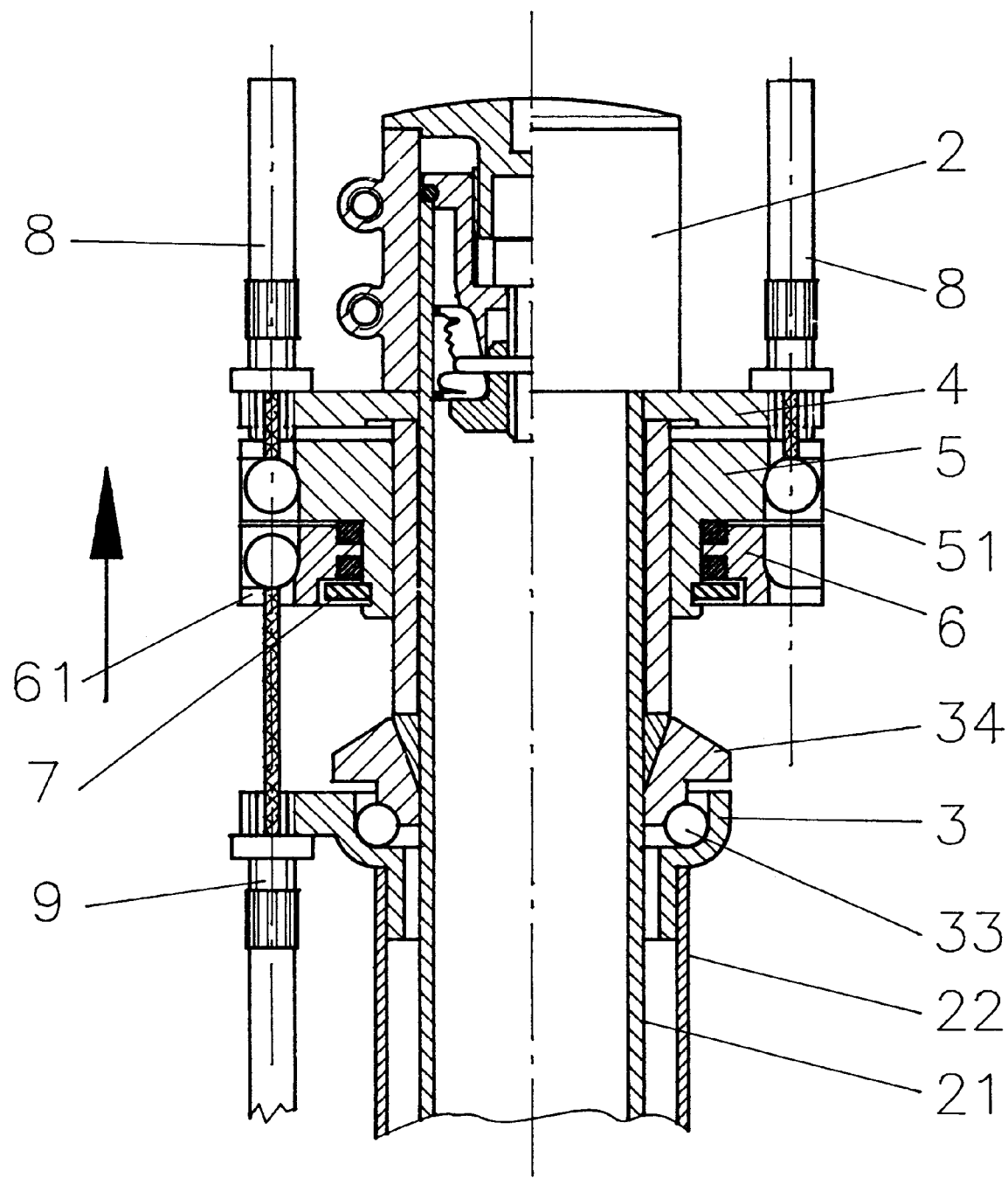
FIG. 5 is a schematic illustration of the supporting bracket showing the movement of the supporting bracket.

By this arrangement, as shown in FIG. 5, when the rider conducts a braking movement through the braking lever (not shown), the upper braking cable 8 is pulled upward. Meanwhile, the upper and lower disks 5, 6 are lifted upward by the upper braking cable 8. Thus, the lower braking cable 9 is also pulled upward. Consequently, the braking pad will press against the rim of the wheel to lower its speed or stop it.

Because only a single braking cable (lower braking cable) is utilized to connected to the braking pad, the steering angle of the front wheel will not be limited by double braking cables. This is really practical and useable for the rider. On the other hand, since only a single braking cable is utilized, it features a simplified configuration that may be readily assembled. This simplified configuration may also entail the benefit of a reduced cost. Thus, market competitiveness may also be increased.

While a particular embodiment of the present invention has been illustrated and described, it should be obvious to those skilled in the art that various other changes and modifications may be made without departing from the spirit and scope of the invention. It is therefore intended to cover in the appended claims all such changes and modifications that are within the scope of the present invention.

I claim:

1. An improved supporting bracket for a braking cable of a bicycle, comprising:

an external tube (22) which at least partially envelopes a vertical tube (21) of a front fork member of a bicycle;

an annular lower braking cable socket (3) having a truncated shape, said socket (3) being biased against a top end of said external tube (22);

a retaining emboss (31) provided on one side of said socket (3);

a receiving slot (32) provided within a top of said socket (3);

a plurality of steel balls (33) movably disposed within said receiving slot (32);

a covering lid (34) provided on top of said socket (3) so as to enclose said balls (33) within said receiving slot (32);

a first C-type retainer (35) disposed between said lid (34) of said socket (3) and said vertical tube (21) such that said lid (34) is secured onto said vertical tube (21);

a sliding collar (36) movably arranged on said vertical tube (21) above said lid (34);

an upper rotational disk (5) arranged on said sliding collar (36), said upper rotational disk (5) having a pair of retaining slots (51) formed on opposite peripheral sides thereof and a lower extension;

a lower rotational disk (6) arranged coaxially around said lower extension of said upper rotational disk (5), said lower rotational disk (6) having at least one retaining slot (61) formed on a peripheral side thereof;

a second C-type retainer (7) arranged to connect said lower rotational disk with said lower extension of said upper rotational disk (5) such that said upper and lower rotational disks (5 & 6) move together in an axial direction;

a bowl-type assembly (2) disposed at a top end of said vertical tube (21);

a primary rotational disk (4) disposed on said bowl-type assembly (2) above said upper and lower rotational disks (5 & 6), said primary rotational disk (4) having a pair of retaining slots (41) aligned with said retaining slots (51) of said upper rotational disk (5);

an upper braking cable (8) which is branched into two parts, each end of said two parts being disposed within a respective one of said retaining slots (41 & 51) of said primary rotational disk (4) and said upper rotational disk (5); and a single lower braking cable (9) having an end which is disposed within said retaining emboss (31) of said socket (3) and said at least one retaining slot (61) of said lower rotational disk (6).

* * * * *